United States Patent [19]

Gebhardt et al.

[11] Patent Number: 5,296,559
[45] Date of Patent: Mar. 22, 1994

[54] POLYIMIDE COMPOSITION

[75] Inventors: Manette M. Gebhardt, Pleasant Hill; Yesh P. Sachdeva, Concord, both of Calif.

[73] Assignee: Dexter-Hysol Aerospace, Inc., Pittsburg, Calif.

[21] Appl. No.: 810,506

[22] Filed: Dec. 19, 1991

[51] Int. Cl.⁵ .................. C08L 79/08; C08F 283/04
[52] U.S. Cl. ...................... 525/426; 525/181; 525/182; 525/183; 525/184; 525/66; 525/436
[58] Field of Search ............. 525/180, 181, 183, 184, 525/426, 66, 436, 184

[56] References Cited

U.S. PATENT DOCUMENTS

| | | |
|---|---|---|
| Re. 30,922 | 5/1982 | Heilman et al. |
| 3,528,950 | 9/1970 | Lubowitz |
| 3,745,149 | 7/1973 | Serafini et al. |
| 3,781,249 | 12/1973 | Lubowitz |
| 3,864,309 | 2/1975 | Bilow et al. |
| 4,020,966 | 5/1977 | Wszolek |
| 4,153,783 | 5/1979 | Gagliani et al. |
| 4,218,555 | 8/1980 | Antonoplos et al. |
| 4,244,853 | 1/1981 | Serafini et al. |
| 4,251,419 | 2/1981 | Heilman et al. |
| 4,255,313 | 3/1981 | Antonoplos et al. |
| 4,299,750 | 11/1981 | Antonoplos et al. |
| 4,305,796 | 12/1981 | Gagliani et al. |
| 4,315,077 | 2/1982 | Gagliani et al. |
| 4,319,000 | 3/1982 | Gagliani et al. |
| 4,332,656 | 6/1982 | Gagliani et al. |
| 4,338,430 | 7/1982 | Edelman |
| 4,365,034 | 12/1982 | Grimes et al. |
| 4,405,770 | 9/1983 | Schoenberg et al. |
| 4,448,957 | 5/1984 | Nagaoka |
| 4,463,128 | 7/1984 | Lin |
| 4,539,342 | 9/1985 | Lee et al. |
| 4,568,405 | 2/1986 | Lin |
| 4,629,777 | 12/1986 | Pfeifer |
| 4,645,823 | 2/1987 | Ai et al. |
| 4,684,714 | 8/1987 | Lubowitz et al. |
| 4,720,539 | 1/1988 | Rabillond et al. |
| 4,954,195 | 9/1990 | Turpin .................. 156/242 |
| 4,996,101 | 2/1991 | Landis et al. |
| 5,041,526 | 8/1991 | Riel et al. |
| 5,041,527 | 8/1991 | Riel et al. |
| 5,041,528 | 8/1991 | Riel et al. |

OTHER PUBLICATIONS

Kinloch et al., "Rubber-Toughened Polyimides," pp. 101-115, *ACS Advances in Chemistry Series* (1984).
Delaney et al., SAMPE Journal, 28(1):31-36 (1992).
Serafini, NTIS N83-15364 (1982).
Reed, Proc. Annual Conference—Resin F. Plast./Compos. Inst. 26-E, I-26-E, 4.
Roberts et al., SAMPE Journal, 22:24 (1986).
Serafini—Aerospace applications of PMR polyimide composites, Int. Conf. Compos. Mater., ICCM-V, Conf. Proc., 5th 1007-23 (1985).
Serafini et al., Addition Type Polyimides from Solutions of Monomeric Reactants, Mater. Rev. 1972, Mat. SAMPE Symp. Exhib. 17th (1972).
Serafini et al., J. Appl. Polym. Sci. 16:905 (1972).
Serafini et al., J. Polym. Sci, Part B: Polymer Physics 25:2275 (1987).
Lauver et al., J. Appl. Poly. Sci. 33:2893 (1987).
Lauver et al., NTIS N79-16921 (1979).
Lauver et al., NTIS N79-16918 (1979).
Yungk et al., PMR-15 Molding Compound Characterization-Paper presented at High Temple Workshop VIII, Riviera Beach, Fla.-Jan. 25, 1988-Jan. 28, 1988.

*Primary Examiner*—James J. Seidleck
*Assistant Examiner*—I. Zemel
*Attorney, Agent, or Firm*—Fish & Richardson

[57] ABSTRACT

A composition that includes a finely divided, fully imidized, polyimide dispersed in a non-volatile, fluidizing resin that is a liquid or low viscosity semi-solid at room temperature. The fluidizing resin is substantially insoluble in the polyimide at room temperature, but soluble in the polyimide at the elevated temperatures during thermal processing. The composition has the flow characteristics of a highly filled liquid. The composition if useful, e.g., as an adhesive.

23 Claims, No Drawings

POLYIMIDE COMPOSITION

BACKGROUND OF THE INVENTION

This invention relates to processing polyimides.

Polyimides are currently used in high temperature composite and adhesive applications. One well-known polyimide is Polymerization of Monomer Reactants ("PMR")-15, a low molecular weight (c.a. 1500), norbornene-terminated polyimide prepared by reacting benzophenone tetracarboxylic acid anhydride and methylene dianiline. These polyimides are typically supplied to the end user in the form of a prepreg fabric or scrim cloth impregnated with the polyamic acid precursor of the polyimide. Upon thermal processing, the polyamic acid groups are converted to imide groups to form a fully imidized polymer, while crosslinking takes place simultaneously through polymerizable end groups (e.g., norbornene groups in the case of PMR-15).

These polyimides suffer from two problems which limit their utility. First, conversion of the polyamic acid groups to imide groups during thermal processing releases large amounts of volatile material. This leads to voids in the final polyimide, resulting in a weakened product. Second, the viscosity of the polyimides prior to thermal processing is too high to permit easy processing. The problem is particularly acute in the case of polyimide adhesives, which have too great a viscosity to be reticulated with a hot air knife.

SUMMARY OF THE INVENTION

In one aspect, the invention features a composition which includes a finely divided, fully imidized, polyimide which is dispersed in a non-volatile, fluidizing resin. The fluidizing resin, which is a liquid or low viscosity semi-solid at room temperature, is substantially insoluble in the polyimide at room temperature (i.e., prior to thermal processing) but soluble in the polyimide at the elevated temperatures used during thermal processing. Following processing as the composition is cooled to room temperature, the fluidizing resin is again substantially insoluble in the polyimide. The fluidizing resin is present in an amount sufficient to impart to the composition the flow characteristics of a highly filled liquid.

The characterization of the polyimide as "fully imidized" refers to the fact that prior to thermal processing, substantially all of the polyamic acid groups have been converted to imide groups. This minimizes the release of volatiles upon heating which leads to voids.

The purpose of the fluidizing resin is to act as a processing aid; thus, upon its addition, the composition has the flow characteristics of a highly filled liquid (the "filler" being the finely divided polyimide which is dispersed in the liquid fluidizing resin), instead of the high viscosity associated with the polyimide alone. To accomplish this, it is a liquid or low viscosity semi-solid at room temperature. During processing at elevated temperatures, the fluidizing resin is soluble in the polyimide, allowing the "plasticized" mass to flow and form adhesive bonds. However, after processing is complete and the composition cooled to room temperature, it is desired that the high strength properties of the polyimide not be compromised. Thus, the fluidizing resin is substantially insoluble in the thermally processed polyimide (i.e., it is not a solvent for the polyimide) after processing.

In preferred embodiments, the polyimide is a thermoplastic or thermosetting polymer (i.e., a polymer capable of forming a thermoset polymer upon thermal processing). The maximum volatiles content of the composition upon thermal processing is 5% by weight or less. The amount of the fluidizing resin in the composition is preferably no greater than 70% (and preferably between 25 and 60%) by weight based upon the combined weight of the polyimide and fluidizing resin. The fluidizing resin may be capable of chemically reacting with the polyimide during processing in order to further prevent it from compromising the properties of the thermally processed polyimide. It may also be a thermosetting resin such that it crosslinks at the elevated temperatures used during thermal processing.

Preferred fluidizing resins have a number average molecular weight of up to 7,000 and a viscosity of up to 1,000,000 cps at 45° C. Particularly preferred fluidizing resins are liquid polybutadiene resins having a 1,2 vinyl content of at least 20% (preferably between 20 and 40%). They may be in the form of homopolymers, copolymers, or resin adducts. Examples of such resins include adducts of the liquid polybutadiene resin with maleic anhydride and styrene-polybutadiene random copolymers. Examples of fluidizing resins which crosslink at the elevated temperatures employed during thermal processing include acetylene-terminated, aromatic polyethers, e.g., Acetylene Terminated Bisphenol ("ATB") resin having the formula

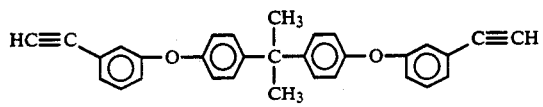

and Acetylene Terminated Sulfone ("ATS") resin having the formula

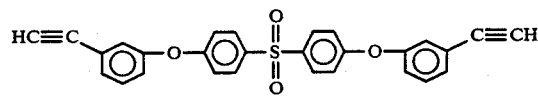

Suitable thermosetting polyimides include the product of an aromatic polyamine (i.e., a compound having two or more amino groups, e.g., methylene dianiline), an aromatic tetracarboxylic acid or anhydride, or alkyl ester thereof (e.g., the methyl ester of benzophenone tetracarboxylic acid), and a polymerizable endcapping agent (e.g., a norbornene endcapping agent). Such polyimides include the class of Polymerization of Monomer Reactants ("PMR") polyimides, including PMR-15. Suitable thermoplastic polyimides include the products of the same polyamine and acid, anhydride, or ester reactants without the polymerizable endcapping agent.

The invention also features a method for preparing a substantially void-free polyimide composition in which the above-described dispersion of finely divided polyimide in fluidizing resin is formed into a shape. The shaped dispersion is then thermally processed. The thermally processed composition may be in the form of an adhesive.

The invention provides polyimide compositions which are readily processed (because the compositions have the viscosity characteristics of a particulate-filled liquid) and have reduced cure volatiles. These compositions can thus be used as adhesives to bond large areas because voids resulting from the release of volatiles during thermal processing (which cause weakening of the bonded area) are significantly reduced. Moreover, their improved processability and reduced volatiles generation make the compositions useful as adhesive systems for many aerospace applications, including sound suppression structure for aircraft engine nacelles. In the case of the latter, the reduced viscosity of the composition (compared to the polyimide alone) allows a nonfabric-containing sheet of the adhesive to be reticulated onto honeycomb cores and perforated facesheets using a hot air knife without blocking the perforation holes. In contrast, the viscosity of the polyimide alone is often too great to allow reticulation. The reduced volatiles also avoids the reduction of honeycomb strength caused by frothing of the adhesive.

Other features and advantages of the invention will be apparent from the following description of the preferred embodiments thereof, and the claims.

DESCRIPTION OF THE PREFERRED EMBODIMENTS

We now describe preferred embodiments of the invention.

Polyimide

Suitable polyimides are the Polymerization of Monomer Reactants ("PMR") polyimides (e.g., PMR-15, a PMR polyimide having a molecular weight of about 1500). These polyimides are the product of an aromatic polyamine, an aromatic tetracarboxylic acid or anhydride, or alkyl ester thereof, and a polymerizable endcapping agent. Examples of preferred tetracarboxylic acid or anhydride monomers include the dimethylester of 3,3',4,4'-benzophenone tetracarboxylic dianhydride (CAS No. 2421-28-5), pyromellitic dianhydride, and hexafluoroisopropylidene bisphthalic dianhydride.

The aromatic polyamine preferably has the formula

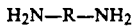

$H_2N-R-NH_2$ where R is a phenyl group or a group having the formula

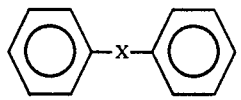

where X is a sulfur, sulfone, oxygen, carbonyl, lower alkylene (e.g., having no more than 4 carbon atoms, e.g., methylene), or fluorinated lower alkylene group. Examples of preferred diamines include methylene dianiline (CAS No. 101-77-9).

Preferred polymerizable endcapping agents include substituted and unsubstituted norbornenes and their esters, including the monomethyl ester of 5-norbornene-2,3-dicarboxylic anhydride (CAS No. 826-62-0).

The polyimide may be provided in the form of a finely divided polymer (e.g., a powder) so that it can be readily dispersed in, and carried by, the fluidizing resin. Such a fully imidized polyimide material is commercially available from Dexter Composites, Cleveland, Ohio under the name "M-100".

Fluidizing Resin

Preferred fluidizing resins are liquid polybutadiene resins in which the 1,2 content is between 20 and 40%. These resins, which have molecular weights up to about 7,000, are liquids or low viscosity semi-solids at room temperature. They may be in the form of homopolymers, copolymers (e.g., random copolymers with styrene), or adducts (e.g., with maleic anhydride). It is important that their viscosities be sufficiently low such that they can act as processing aids for the relatively high viscosity polyimide. The viscosity of the fluidizing resin is preferably no greater than 1,000,000 cps at 45° C.

Also preferred are the Acetylene Terminated Bisphenol ("ATB") and Acetylene Terminated Sulfone ("ATS") resins described in the Summary of the Invention, above, which can crosslink at the elevated temperatures employed during processing through their polymerizable acetylene end groups.

As described in the Summary of the Invention, above, the fluidizing resin is chosen such that the fluidizing resin is substantially insoluble in the polyimide at room temperature; thus, it is substantially insoluble in the polyimide both before and after thermal processing. The purpose of requiring post-processing insolubility is to ensure that following processing, the fluidizing resin does not act as a solvent for the polyimide, thereby impairing its physical properties. In this way, the composition is able to take advantage of the lower viscosity (compared to the polyimide) of the fluidizing resin during processing, while the properties of the final product are dominated by the polyimide.

The purpose of requiring pre-processing insolubility is to give the unprocessed polyimide/fluidizing resin combination both good processing reproducibility and shelf life. If there is too much pre-processing solubility, the amount of free polyimide is reduced and the viscosity increases significantly, thereby impairing processability. To minimize the production of void-forming volatiles during thermal processing, the fluidizing resin should also be substantially non-volatile at the thermal processing temperature (e.g., about 600° F.).

During processing at elevated temperatures, the fluidizing resin is soluble in the polyimide so that it "plasticizes" the polyimide, allowing it to flow. In this way, the fluidizing resin enhances processability of the otherwise high viscosity polyimide.

Examples of suitable fluidizing resins are the Ricon resins commercially available from Advanced Resins, Inc., Broomfield, Colo. Their properties are summarized below in Tables I and II.

TABLE I

| LIQUID POLYBUTADIENE MALEIC ANHYDRIDE ADDUCTED RESINS | | | | | |
|---|---|---|---|---|---|
| | 1-2 VINYL | 1-4 TRANS | 1-4 CIS | MOLECULAR WT. ($M_n$ BY GPC) | VISCOSITY 25° C., cps | MALEIC CONTENT % by WT. |
| PRODUCT | | | | | | |
| Ricon 130/MA8 | 40 | 40 | 20 | 2500 | 5000 | 8 |
| Ricon 130/MA13 | 40 | 40 | 20 | 2800 | 14000 | 13 |
| Ricon 130/MA3 | 30 | 50 | 20 | 2000 | 6000 | 3 |

TABLE I-continued
LIQUID POLYBUTADIENE MALEIC ANHYDRIDE ADDUCTED RESINS

| | 1-2 VINYL | 1-4 TRANS | 1-4 CIS | MOLECULAR WT. ($M_n$ BY GPC) | VISCOSITY 25° C., cps | MALEIC CONTENT % by WT. |
|---|---|---|---|---|---|---|
| Ricon 130/MA5 | 30 | 50 | 20 | 2500 | 7000 | 5 |
| Ricon 130/MA10 | 30 | 50 | 20 | 4500 | 48000 | 10 |
| Ricon 130/MA12 | 30 | 50 | 20 | 5000 | 60000 | 12 |
| Ricon 131/MA17 | 20 | 50 | 30 | 6500 | 47000* | 17 |

*Measured at 45° C.

TABLE II
LIQUID POLYBUTADIENE-STYRENE RANDOM COPOLYMER ADDUCTED WITH MALEIC ANHYDRIDE

| | 1-2 VINYL | 1-4 TRANS | 1-4 CIS | MOLECULAR WT ($M_n$ by GPC) | VISCOSITY @ 45° C., cps | STYRENE % by WT. | MALEIC CONTENT % by WT. |
|---|---|---|---|---|---|---|---|
| Ricon 181/MA10 | 30 | 50 | 20 | 2000 | 160000 | 30 | 10 |
| Ricon 184/MA6 | 30 | 50 | 20 | 3000 | 65000 | 30 | 6 |
| Ricon 184/MA17 | 30 | 50 | 20 | N.D.* | 1000000 | 30 | 16 |

*Not determined

Preparation

The composition is prepared by dispersing the finely divided, fully imidized polyimide in the fluidizing resin. The amount of fluidizing resin is preferably between 25 and 60% by weight based upon the combined weight of polyimide and fluidizing resin. In general, the fluidizing resin is heated (typically to about 80°-100° C.) and then weighed into the mixing vessel (e.g., a triple range Ross mixer which combines a high shear dispersing blade, an auger type mixer, and a planetary mixer). The polyimide is then slowly added to the fluidizing resin while mixing.

Following mixing, the composition may be provided directly to the customer in the form of a liquid adhesive. It can also be provided as a film adhesive plied between two release sheets. A scrim fabric (e.g., a woven glass fabric) can be added to the film prior to placing it between the release sheets. The customer then thermally processes the composition.

Polyimide compositions were prepared according to the invention by dispersing M-100 powder (fully imidized PMR-15 powder commercially available from Dexter Composites) in Ricon 131-MA10 resin (a maleated liquid 1,2 polybutadiene resin available from Advanced Resins). The adhesive shear strength of the material was then measured according to ASTM D-1002 using 17-7pH stainless steel adherends. The adhesive was cured for 6 hours at 600° F. in an autoclave under 50 psi pressure using a vented vacuum bag. The percent cure volatiles, viscosity, and ability of the composition to be reticulated were also evaluated, as was the physical form of the composition. The results are set forth below.

| | A | B | C | D | E | PMR-15[1] |
|---|---|---|---|---|---|---|
| Composition (% w/w) | | | | | | |
| M-100 | 100 | 75 | 71 | 67 | 50 | |
| Ricon 131-MA10 | 0 | 25 | 29 | 33 | 50 | |
| Physical Form | 1 | 2 | 2 | 2 | 2 | 2 |
| Cure volatiles (% w/w) | <3 | <3 | <3 | <3 | <3 | 12-15 |
| Viscosity (poise) | 30000[2] | 700[3] | — | 300[3] | 100[3] | — |
| Reticulatable | NO | NO | YES | YES | YES | — |
| Adhesive Shear Strength (psi) | | | | | | |
| @ 75° F. | 3200 | 2790 | 2740 | 2970 | 2880 | 2500 |
| @ 600° F. | 3170 | 2550 | 2730 | 2400 | 1790 | 2000[4] |

Physical Form: "1" designates a high softening temperature powder; "2" designates a tacky, drapable film adhesive.
[1] Commercially available product described in Reifler, R.S., 30th National SAMPE Symposium, March 19-21, 1985, p. 479.
[2] Measured at 220° C.
[3] Measured at 75° C.
[4] Measured at 550° F.

Compositions were also prepared as described above in which ATB and ATS resins were substituted for the Ricon 131-MA10 fluidizing resin. Thermal processing was carried out at 550° F. The results are set forth below.

| | 1 | 2 | 3 | 4 | PMR-15* |
|---|---|---|---|---|---|
| Composition (% w/w) | | | | | |
| M-100 | 50 | 43 | 29 | 0 | |
| ATB | 35 | 40 | 50 | 70 | |
| ATS | 15 | 17 | 21 | 30 | |
| Adhesive Shear Strength (psi) | | | | | |
| @ 75° F. | 3250 | 3100 | 2500 | 2080 | 2500 |
| @ 550° F. | 3170 | 2600 | 2300 | 1450 | 2000 |

*Commercially available product described in Reifler, R.S., 30th National SAMPE Symposium, March 19-21, 1985, p. 479.

Other Embodiments

Other embodiments are within the following claims.

For example, thermoplastic polyimides may be used in place of thermosetting polyimides. The polyimide/fluidizing resins are prepared as described above in the case of thermosetting polyimides.

I claim:

1. A composition comprising a finely divided, fully imidized, thermosetting polyimide dispersed in a nonvolatile, fluidizing resin which is a liquid or low viscosity semi-solid at room temperature and substantially insoluble in the thermosetting polyimide at room temperature but soluble in the thermosetting polyimide at the elevated temperatures used during thermal processing, said fluidizing resin being present in an amount sufficient to impart to said composition the flow characteristics of a highly filled liquid.

2. The composition of claim 1 wherein the amount of said fluidizing resin is no greater than 70% by weight based upon the combined weight of polyimide and fluidizing resin.

3. The composition of claim 1 wherein the amount of said fluidizing resin is between 25 and 60% by weight based upon the combined weight of polyimide and fluidizing resin.

4. The composition of claim 1 wherein said fluidizing resin is capable of chemically reacting with said polyimide at elevated temperatures during thermal processing.

5. The composition of claim 1 wherein said fluidizing resin is a thermosetting resin.

6. The composition of claim 1 wherein the number average molecular weight of said fluidizing resin is up to 7,000.

7. The composition of claim 1 wherein the viscosity of said fluidizing resin at 45° C. is up to 1,000,000 cps.

8. The composition of claim 1 wherein said fluidizing resin comprises a liquid polybutadiene resin having a 1,2 vinyl content of at least 20%.

9. The composition of claim 8 wherein the 1,2 vinyl content of said resin is between 20 and 40%.

10. The composition of claim 1 wherein said fluidizing resin is an adduct of a liquid 1,2 polybutadiene resin having a 1,2 vinyl content of at least 20% and maleic anhydride.

11. The composition of claim 1 wherein said fluidizing resin is a styrene-1,2 butadiene random copolymer having a 1,2 vinyl content of at least 20%.

12. The composition of claim 1 wherein said fluidizing resin is an adduct of a styrene-1,2 butadiene random copolymer having a vinyl content of at least 20% and maleic anhydride.

13. The composition of claim 1 wherein said fluidizing resin is an acetylene-terminated polyether resin.

14. The composition of claim 13 wherein said fluidizing resin is ATB resin having the formula

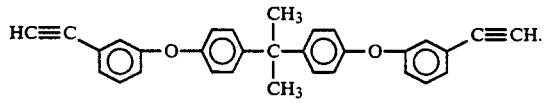

15. The composition of claim 13 wherein said fluidizing resin is ATS resin having the formula

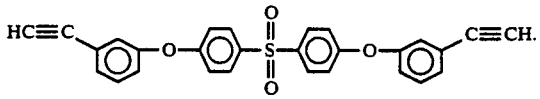

16. The composition of claim 1 wherein the maximum volatiles content of said composition following thermal processing is 5% by weight or less.

17. The composition of claim 1 wherein said polyimide is a thermosetting polyimide which is the product of an aromatic polyamine, an aromatic tetracarboxylic acid or anhydride, or alkyl ester thereof, and a polymerizable endcapping agent.

18. The composition of claim 17 wherein said polyimide is the product of methylene dianiline, the methyl ester of benzophenone tetracarboxylic acid, and a norbornene endcapping agent.

19. The composition of claim 1 wherein said polyimide is the product of an aromatic polyamine and an aromatic tetracarboxylic acid or anhydride, or alkyl ester thereof.

20. The composition of claim 19 wherein said polyimide is the product of methylene dianiline and the methyl ester of benzophenone tetracarboxylic acid.

21. A thermally processed adhesive composition comprising a finely divided, fully imidized polyimide dispersed in a non-volatile, fluidizing resin which is a liquid or low viscosity semi-solid at room temperature and substantially insoluble in the thermally processed polyimide.

22. A method of preparing a substantially void-free polyimide composition comprising the steps of dispersing a finely divided, fully imidized, thermosetting polyimide in a non-volatile, fluidizing resin which is a liquid or low viscosity semi-solid at room temperature and substantially insoluble in the thermosetting polyimide at room temperature but soluble in the thermosetting polyimide at the elevated temperatures used during thermal processing, said fluidizing resin being present in an amount sufficient to impart to said composition the flow characteristics of a highly filled liquid;

forming the resulting dispersion into a shape; and thermally processing said composition at elevated temperatures.

23. The composition of claim 17 wherein said polyimide is the product of phenylene diamine, hexafluoroisopropylidene bisphthalic dianhydride, and a norborene endcapping agent.

* * * * *